Dec. 1, 1959    T. L. FAWICK    2,914,959
WORK-HANDLING APPARATUS
Filed June 23, 1954
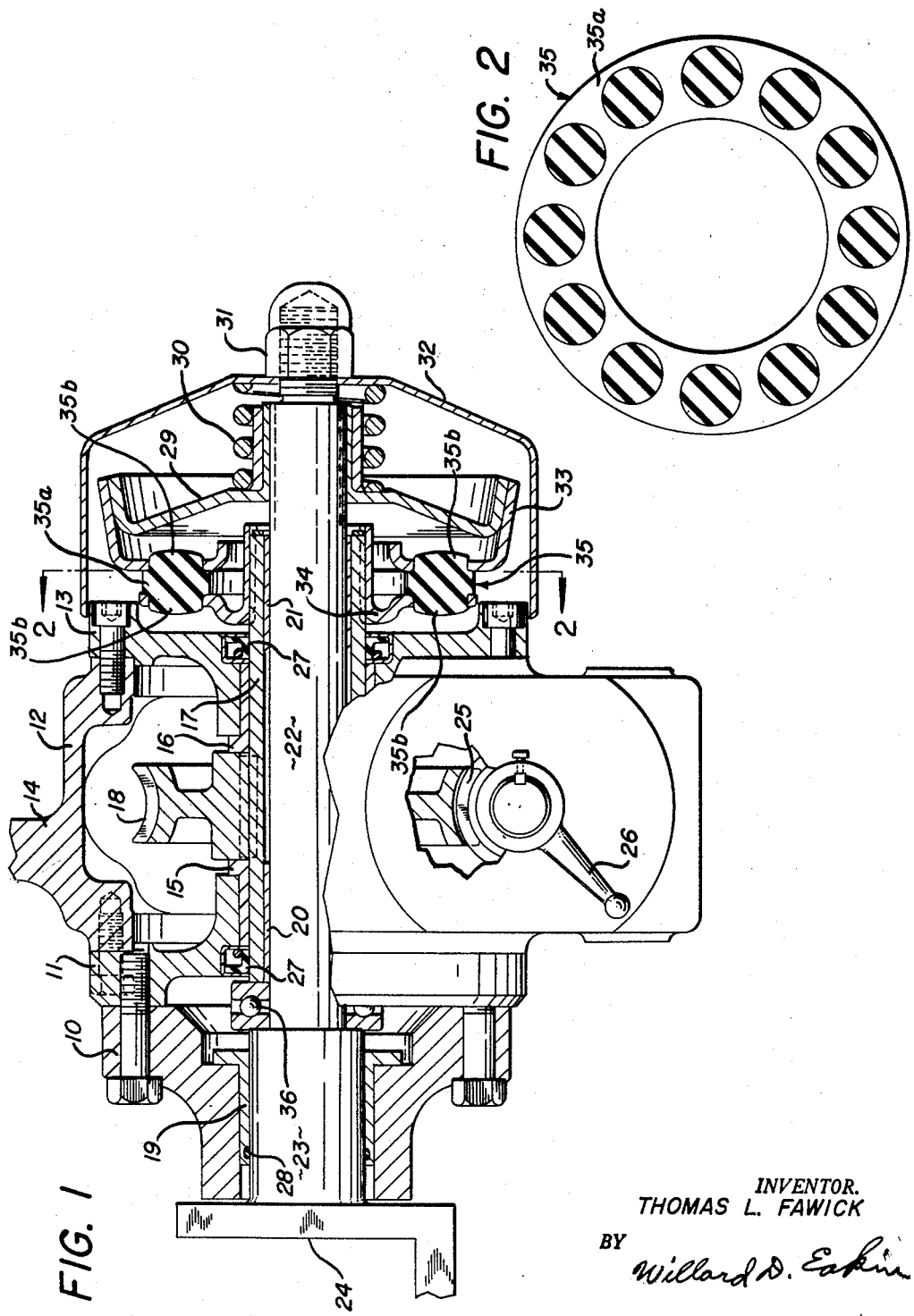
INVENTOR.
THOMAS L. FAWICK
BY
Willard D. Eakin
ATTORNEY

United States Patent Office 2,914,959
Patented Dec. 1, 1959

2,914,959

WORK-HANDLING APPARATUS

Thomas L. Fawick, Cleveland, Ohio, assignor to Fawick Corporation, a corporation of Michigan Application June 23, 1954, Serial No. 438,793

3 Claims. (Cl. 74—411)

This invention relates to worm-type reduction-gear assemblies such as are used in automobile production lines for supporting a part or all of an engine from an overhead conveyor in the course of assembly and adjustment, and tilting the work unit to different angular positions for convenience of the workmen.

In this particular application of the invention the assembly comprises an engine-supporting cradle secured upon an end of an approximately horizontal shaft which is turned to and held in different angular positions by a manually operated worm and gear.

When such operations are completed, the engine assembly is transferred to other supporting means by lowering the reduction-gear and cradle assembly and thus depositing the engine assembly upon the other support. As the worm and gear may be holding the engine in a tilted condition when this is done, so that it does not initially contact its new support at spaced positions such as to give it stability against gravity, and as the pitch of the worm and gear is such that the gear cannot turn the worm, a severe torque shock is frequently sustained by the gear, worm and shaft, with breakage frequently resulting.

My chief object is to avoid such breakage by relieving or cushioning the torque shocks. A more general object is to provide improved means for cushioning shocks sustained by a reduction gear assembly.

Of the accompanying drawings:

Fig. 1 is an elevation, with parts broken away and parts shown in axial vertical section, of a reduction gear assembly embodying my invention in its preferred form for the use above referred to.

Fig. 2 is a section on line 2—2 of Fig. 1.

The assembly comprises a gear housing or frame made up of annular parts 10, 11, 12 and 13 bolted together as shown. The annular part 12 is formed at its top with a suspension arm 14 by which the assembly is adapted to be supported, through a suitable hoist, not shown, from an overhead conveyor track.

Journaled in bearings 15, 16 in the members 11 and 13 respectively is a quill 17 upon which the worm-gear, 18, is keyed or splined.

Journaled in a bearing 19 in the member 10 and in bearings 20 and 21 in the quill is a shaft 22 having integral or rigid with it a head 23, in the bearing 19, and, beyond the latter, an engine-supporting cradle 24.

Journaled in walls of the casing member 12 is a worm 25 meshed with the worm-gear 18 and provided outside of the housing with a hand crank 26.

Oil seals 27, 27 are provided for retaining lubricant in the worm-and-gear chamber defined by the members 11, 12 and 13, and an O-ring 28 is provided for retaining lubricant in the chamber defined by the members 10 and 11.

Splined upon the end of the shaft 22 that is remote from the engine cradle is the male member 29 of a cone type overload slip coupling, which has a compression spring 30 surrounding the hub of the member 29 and adapted to be put under different strains by an adjusting nut 31 threaded upon the end of the shaft 22 and bearing against a protective hood member 32, against the inner face of which the spring is seated. The rim of the hood member surrounds the casing member 13 in slidable relation thereto, for exclusion of foreign matter from the slip clutch.

The mounting for the female member, 33, of the slip coupling comprises an annular metal stamping 34 which is splined upon the quill 17 and is formed with a set of circumferentially spaced socket holes registered with a like set of socket holes formed in the female clutch member 33.

An annular cushioning member 35, of natural rubber or, if desired, of oil-resistant synthetic rubber, consists of an endless web portion 35ᵃ, Fig. 2, and, integrally projecting from its opposite faces, sets of circumferentially spaced lugs or bosses 35ᵇ, 35ᵇ. The lugs of one set fit in the holes in the stamping 34 and those of the other set fit in the holes of the female clutch member 33. The cushioning member is held in that relationship, with its web portion 35ᵃ embraced by the apertured sheet-metal members, by the force of the spring 30, which keeps the members 29 and 33 of the overload slip coupling constantly engaged, with suitably adjusted pressure to hold the cradle 24, against ordinary strains, in the various angular positions to which it is turned by means of the hand crank 26, but with such moderate pressure as to permit the members 29 and 33 to slip on one another in response to a higher torque force imparted to them through, or sustained by, the cushion member 35.

For sustaining the thrust of the spring 30, upon the shaft 22 in one direction and upon the quill 17 in the other direction, a thrust bearing 36 is mounted upon the shaft between the shoulder of its head 23 and the adjacent end of the quill.

The construction as described is such that rotation of the worm-gear 18 by means of the hand crank applies the torque, through the relatively light quill 17 and the cushioning member 35, to the slip coupling, and only from the latter to the shaft 22 and the engine cradle.

Likewise torque shocks are transmitted, from the cradle to the worm-gear, or from the worm-gear to the cradle, only through the cushioning member and the slip coupling in series, and this is true of shocks received and transmitted by the hand crank.

Thus the rubber member 35 is adapted to provide close-coupled and effective cushioning of the torque shocks, all of the members of the force-transmitting train between the gear and the shaft being of relatively light weight and consequently low inertia.

Because of the cushioning effect of the member 35, adequate to absorb the moderate shocks itself, the coupling is required to slip less often than if the cushioning member were not present. Also, the dulling of the shocks by the cushioning member results in less sudden and violent slipping of the clutch and in fact permits the use of a relatively moderate engagement pressure for the coupling, for its job of normally holding the cradle in the positions to which it is turned by means of the hand crank.

The cushioning member can be economically formed in a molding operation apart from the metal members and can be readily mounted or removed for substitution of a new cushioning member.

Modifications are possible within the scope of the invention as defined in the appended claims.

I claim:

1. Work-handling apparatus comprising a frame having means for suspending it from an overhead support and, mounted upon said frame and therewith constituting a suspended work-supporting unit, a force sustaining train of elements journaled in said frame and comprising a shaft, a work-support secured to said shaft for turning therewith to different rotative positions, a worm-gear for rotating said shaft to such positions, a worm meshed with said worm-gear for rotating it to and holding it in different rotative positions, and torque-cushioning means and a two-way slip coupling in series with and operatively between said shaft and said worm-gear for cushioning shocks transmitted from said work-support to said worm-gear.

2. Apparatus as defined in claim 1 in which the torque-cushioning means comprises a ring of material having substantially the resilient deformability of vulcanized soft-rubber and having projections formed on its axially opposite faces and a pair of members having respective disc-shaped parts embracing said ring and formed with sockets occupied by the said projections.

3. Apparatus as defined in claim 2 in which one of the defined pair of members is one of the slip coupling elements.

References Cited in the file of this patent

UNITED STATES PATENTS

| | | |
|---|---|---|
| 1,843,875 | Kendall | Feb. 12, 1932 |
| 1,952,728 | Rathbun | Mar. 27, 1934 |
| 1,959,042 | Staley | May 15, 1934 |
| 2,050,542 | Pace | Aug. 11, 1936 |
| 2,144,322 | Benson | Jan. 17, 1939 |
| 2,167,373 | Roche | July 25, 1939 |
| 2,517,887 | Korn | Aug. 8, 1950 |
| 2,521,191 | Stanland | Sept. 5, 1950 |
| 2,688,883 | Schut | Sept. 14, 1954 |

FOREIGN PATENTS

| | | |
|---|---|---|
| 390,420 | Great Britain | Apr. 6, 1933 |